Aug. 22, 1933.    J. K. HODNETTE    1,923,727
PROTECTION OF DISTRIBUTION TRANSFORMERS AGAINST LIGHTNING
Filed Dec. 1, 1931    2 Sheets-Sheet 1
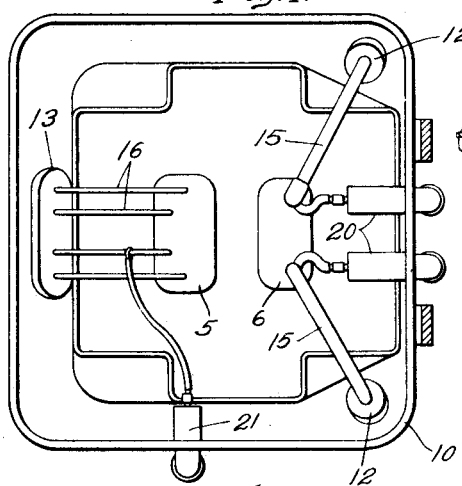
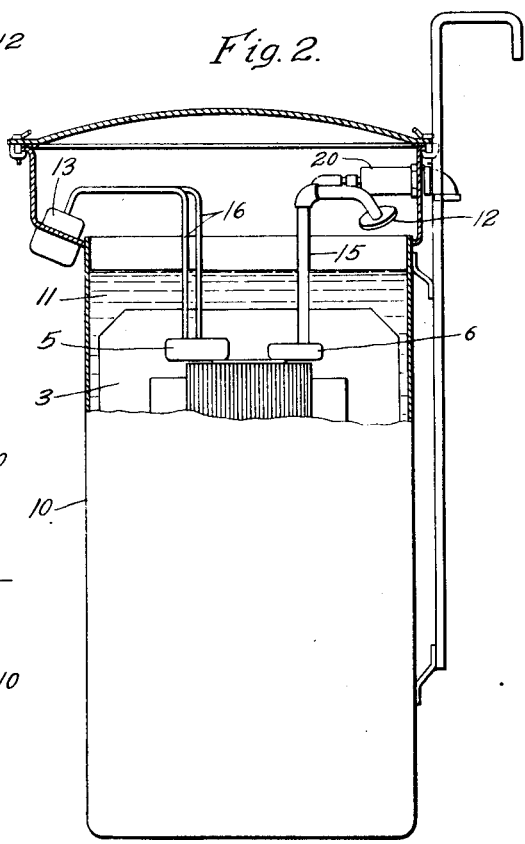
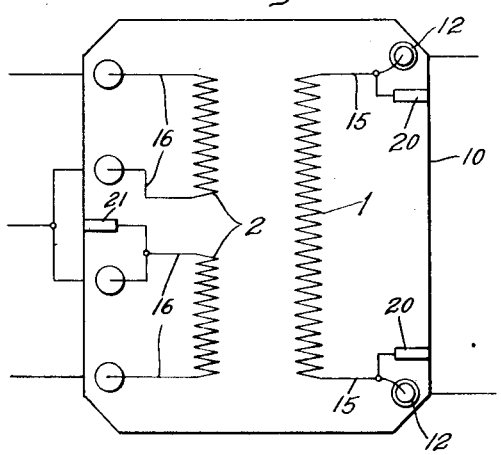
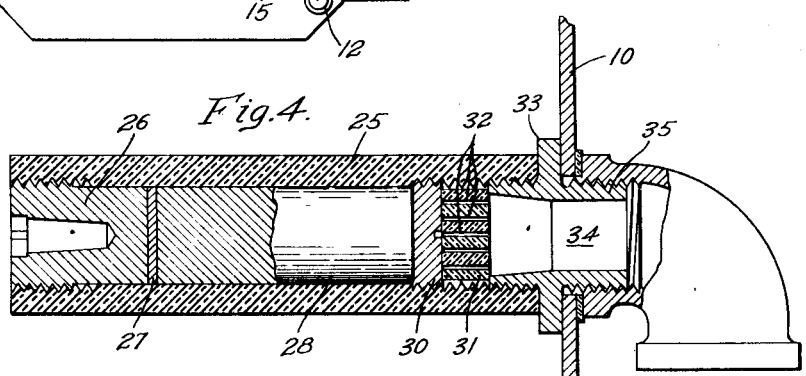
WITNESSES:
INVENTOR
John K. Hodnette.
BY
O.B. Buchanan
ATTORNEY

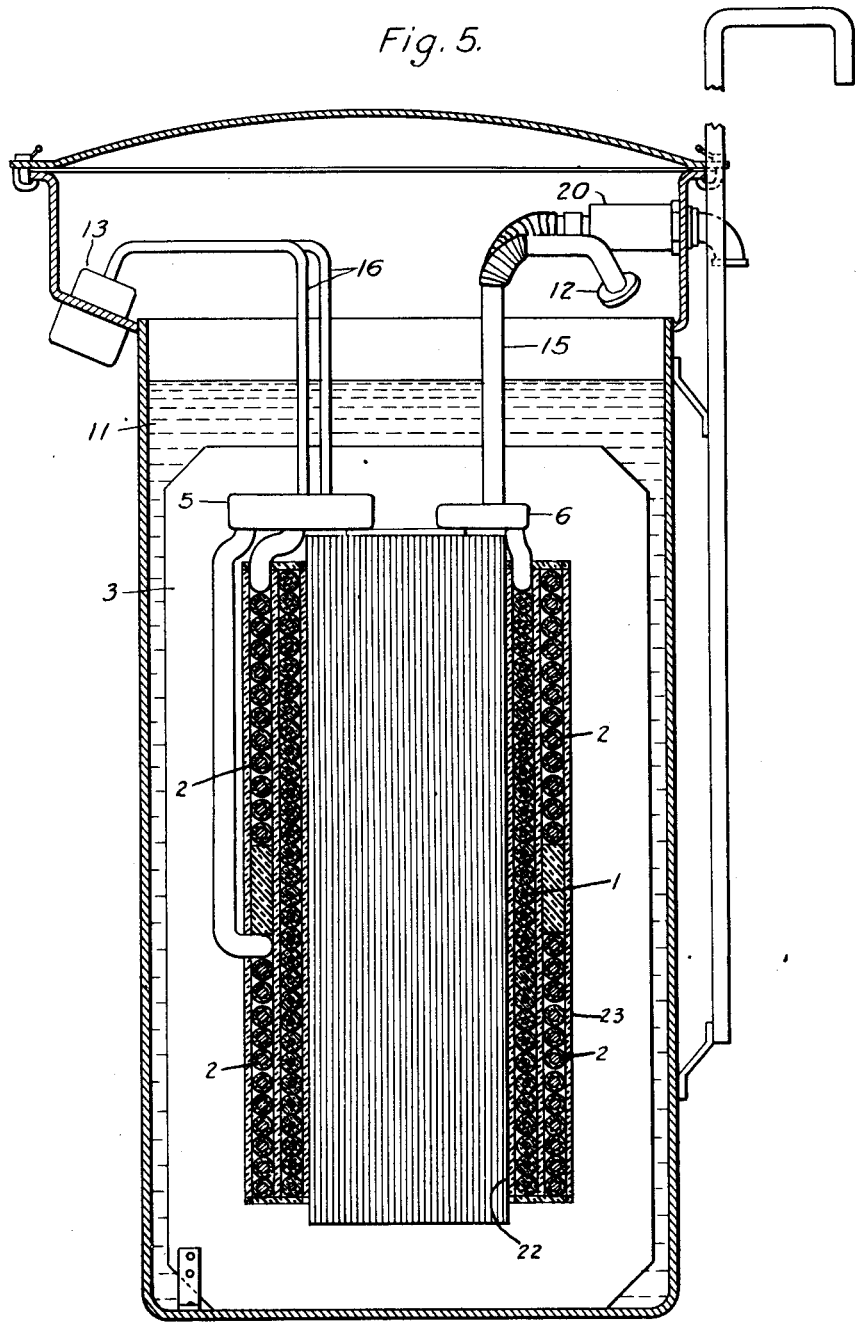

Patented Aug. 22, 1933

1,923,727

UNITED STATES PATENT OFFICE

1,923,727

PROTECTION OF DISTRIBUTION TRANSFORMERS AGAINST LIGHTNING

John K. Hodnette, Sharon, Pa., assignor to Westinghouse Electric & Manufacturing Company, a Corporation of Pennsylvania Application December 1, 1931. Serial No. 578,300

20 Claims. (Cl. 175—361)

My invention relates to surge-proof electrical devices, and in particular to distribution transformers in which means are provided for limiting the surge potential stresses between component parts and for controlling the dynamic fault current.

Electrical apparatus, and particularly distribution transformers connected to overhead lines, are subject to high potential surges usually resulting from lightning. Distribution transformers as they are built and operated at present, and with present methods of protection, are often subjected to surges of such high magnitude that the insulation either between various portions of the electrical winding or between the winding and the enclosing or supporting structure is broken down.

In the case of power transformers, a relief or discharge gap having a breakdown voltage less than the breakdown strength of the transformer insulation is placed in the circuit to protect the transformers and drain off the surge voltages. This practice has also been applied to distribution transformers by providing a flashover point between the winding and the casing, usually in the form of stud type bushings. This practice necessitates that the transformer case be connected to ground. This is undesirable in many cases, particularly pole mounted equipment, where workmen are exposed to the high potential lines when performing work thereon. In case a flashover occurs between the windings of a transformer and a grounded casing, the arc will persist until the protective apparatus has disconnected the faulty transformer, thus interrupting the service to which the transformer is connected. This is a serious disadvantage as in many cases an interruption of service cannot be tolerated.

The best means discovered heretofore for preventing such damage and interruption is to connect lightning arresters to each electrical lead connected to the apparatus. These lightning arresters are grounded in order to drain off the surge potential attempting to enter the apparatus. This method of protection proves inadequate unless the resistance of the ground connection is relatively low and the electrical length of the grounded conductor relatively short, otherwise a high surge potential will be built up upon the winding and the insulation damaged as before.

It is an object of my invention to provide an electrical device in which the surge voltage is limited to a safe value in such a manner as to eliminate failure of the apparatus because of surges between the component parts.

It is a further object of my invention to provide means for controlling surges in distribution transformers in such a manner that any follow current caused by the surge will be interrupted without causing an outrage on the system supplied by the transformer.

It is a further object of my invention to provide a surge-proof transformer having self quenching means for dissipating the surges reaching the transformer from an outside source.

It is a further object of my invention to provide an improved self-extinguishing arc-discharge device especially suitable for use in transformers.

Other objects of my invention will be apparent from the following detailed description, taken in conjunction with the accompanying drawings in which, Figures 1 and 2 are fragmentary views of a transformer embodying my invention, Fig. 3 is a schematic diagram showing one manner of connection according to my invention, Fig. 4 is a sectional view of my improved discharge device, and Fig. 5 is an enlarged sectional elevation of a transformer embodying my invention.

The apparatus according to my invention comprises a transformer having a high tension winding 1 and low tension windings 2 suitably insulated therefrom, both windings being connected magnetically by a suitable core structure 3. Preferably, the terminals from both of these windings will be brought out to suitable terminal boards 5 and 6.

The entire windings with their core are received in a suitable tank 10. Preferably, this tank is filled with sufficient oil 11 to completely cover the core 3 and its associated windings. At some point, generally above the oil level, bushings 12 and 13 are provided for the conducting leads 15 and 16 attached to the various windings.

Inside the tank, I provide a plurality of electrical discharge devices 20, preferably of the type invented by W. G. Roman, although any suitable device may be used. One of the discharge devices 20 is connected to each of the high tension leads 15, the devices attached to the high tension leads being in turn connected to the enclosing casing 10. The discharge devices have a break-down voltage sufficiently high, so that an arc discharge will not be initiated by the customary dynamic voltage applied to the line. A similar electrical discharge device 21 is connected between the tank 10 and the neutral 16 of the secondary windings.

I prefer to provide discharge devices 20 for the high tension leads having a cut-off voltage higher than the crest value of the normal high tension voltage, while the discharge device 21 connected to the low tension winding has a cut-off voltage higher than the normal crest voltage of the low tension winding.

In operation, a transformer protected according to my invention may be provided with a plurality of high tension electrical discharge devices 20 and at least one low tension discharge device 21. When a high-voltage surge approaches the transformer, over any or all of the high tension leads, the discharge device 20 connected to the high voltage leads will operate to limit the voltage between winding and core and hence the stress to the insulation 22 between the winding 1 and its core 3 or other supporting parts which are connected to the core. Simultaneously, the operation of the gap 21 between the tank 10 and the grounded low voltage lead 16 will limit the voltage between the low voltage winding 2 and the tank and hence the voltage stress in the insulation 23 between the low voltage winding 2 and the core 3 or other supporting parts.

In most cases, one or more of the leads 16 from the low tension windings will be grounded and the surge will follow this grounded lead and be conducted to earth. I prefer to provide a resistance element in series with the discharge devices in order to limit the follow current which ordinarily occurs when the surge potential causes operation of the discharge devices. For this purpose, I prefer to use a resistor having a negative characteristic, that is, a reducing resistance with the increasing current. In practice, I use resistors composed of zircon, carborundum, clay or graphite.

I have found that the most suitable manner of applying a resistor is to construct a combination discharge device and resistor element. A discharge device according to my invention comprises a casing 25 of suitable insulating material, preferably tubular in shape. I have found that ordinary hard fiber is suitable for this casing. In one end of the casing is a suitable electrode 26 for connection to the winding to be protected. Preferably, this electrode is in oil tight relation with the insulating casing 25, so that, if desired, the discharge device may be placed below the oil level in the transformer. Adjacent one end of this electrode is a disc or washer 27 of soft material, such as lead. A rod-like resistor element 28 is placed in the tubular casing and pressed into firm contact with the soft washer 27 by means of a suitable electrode 30, preferably screw threaded into the interior of the casing 25.

Adjacent to this internal electrode 30, I place a body 31 of non-conducting material which will evolve large quantities of gas when subjected to an electric arc. I have found that ordinary hard fiber or compressed boric acid is suitable for this purpose. Preferably, this gas evolving body is provided with a plurality of arc passages 32 according to the disclosure of Mr. Roman, application Serial No. 593,989, filed February 19, 1932. The gas evolving material is retained in the casing by a terminal electrode 33, preferably connected in oil tight relation to the end of the casing. This electrode is provided with a suitable passage or passages 34 for the gas evolved by the insulating body 31. A portion 35 of the electrode 33 extends through the tank wall, so that the evolved gases are discharged outside of the transformer tank 10, and is preferably electrically connected to the tank wall as hereinbefore described.

In use, I prefer to utilize the resistors 28 with each discharge device so that there will be some difference of potential between the high tension winding 1 and the casing 10 with its associated core 3 and between the casing 10 and the low tension windings 2. However, the resistor may be omitted from one or more of the discharge devices.

While I have shown and described a specific embodiment of my invention, it is apparent that changes and modifications can be made therein without departing from the spirit and scope of my invention. I desire, therefore, that only such limitations shall be imposed as are embodied in the accompanying claims or as may be necessitated by the prior art.

I claim as my invention:

1. A surge-proof transformer comprising a high tension winding, a low tension winding insulated from the high tension winding, a ground connection attached to said low tension winding, a plurality of connections to said high tension winding, a metallic casing enclosing both of said windings, a self-extinguishing arc-discharge device between each of the high tension leads and said casing and an arc-discharge device between the casing and the grounded connection for the low tension winding.

2. A surge-proof transformer comprising a magnetizable core, high and low tension windings on the core, a casing surrounding said core and said windings, said casing being electrically connected to said core, a plurality of high tension leads extending from the high tension winding through the casing, bushings for insulating the leads from the casings, a self-quenching discharge device in said casing for each of said leads, one terminal of each of said discharge devices extending through the casing and electrically connected thereto, said terminals being hollow for venting said self-quenching discharge device, and means comprising an electrical discharge device for connecting said casing to the low tension winding.

3. A surge-proof transformer comprising a magnetizable core, high and low tension windings on the core, a casing surrounding said core and said windings, said casing being electrically connected to said core, a plurality of high tension leads extending from the high tension winding through the casing, bushings for insulating the leads from the casings, a self-quenching discharge device in said casing for each of said leads, one terminal of each of said discharge devices extending through the casing and electrically connected thereto, said terminals being hollow for venting said self-quenching discharge device, means comprising an electrical discharge device for connecting said casing to ground, and a resistance element for limiting the current through the discharge devices.

4. A surge-proof transformer comprising a plurality of windings, a tank enclosing said windings, an insulating cooling fluid in said tank, a plurality of leads from the windings, at least two of said leads being high potential leads, an electrical discharge device between each of the high tension leads and the tank, said discharge devices having an initial breakdown higher than the crest voltage of the high tension leads and having a cut-off voltage sufficiently high to promptly cut off the discharge when an excess-voltage surge has been dissipated and the voltage returns to normal, and an electrical discharge device between the tank and ground.

5. An electrical discharge device for operation in an oil filled transformer tank comprising an insulating body, a conducting terminal in oil tight relation with one end thereof, a molded resistance element in said body, a soft metal disk between the terminal and the resistance element, an electrode in said body, said electrode making contact with said element and adapted for pressing it into firm contact with the terminal, a fiber block spaced from said electrode, said block having a plurality of parallel discharge passages therein, and a second electrode in oil tight relation to the casing.

6. The combination with an oil filled transformer tank, of an electrical discharge device therein, comprising an insulating body, a conducting terminal in oil tight relation with one end thereof, a molded resistance element in said body, a soft metal disk between the terminal and the resistance element, an electrode in said body, said electrode making contact with said element and adapted for pressing it into firm contact with the terminal a fiber block spaced from said electrode, said block having a plurality of parallel discharge passages therein, and a second electrode in oil tight relation to the casing, said electrode having a portion adapted to extend through and make contact with the tank wall and means for securing the electrode in oil tight relation to the tank, said electrode having a vent hole therein.

7. A surge-proof transformer comprising a high tension winding, a low tension winding insulated from the high tension winding, a ground connection attached to said low tension winding, a plurality of connections to said high tension winding, a metallic casing enclosing both of said windings, a self-extinguishing electric discharge device between each of the high tension connections and said casing, a low voltage gap between the casing and ground, and means for limiting the power current flowing through the discharge devices.

8. An electrical device comprising a winding, leads for connecting the winding to an external circuit, a core for said winding, insulation between the winding and the core, a casing about the winding, and a plurality of self extinguishing electric discharge devices connected from said winding to the core for limiting over voltage stresses on the insulation to a predetermined value.

9. The combination with an encased electrical apparatus having a casing of conducting material, of an insulated lead extending from said apparatus through the apparatus casing, excess-voltage protective means for connecting said lead to said casing, and means for completing the excess-voltage discharge path from the casing to ground, characterized by said excess-voltage means being of a type which will change from substantially a non-conductor to a voltage-limiting conductor at a predetermined excess-voltage, and which will promptly change back again from a conductor to substantially a non-conductor when an excess-voltage surge has been dissipated and the voltage on said lead returns to the normal voltage of said apparatus, whereby said apparatus is rendered truly surge-proof in being able to continue to give service without interruption by a surge.

10. A surge-proof protective device for a transformer having a conducting casing, and a plurality of high-tension leads and a plurality of low-tension leads all extending from said transformer through said casing, said protective device comprising excess-voltage means associated with each high-tension lead for providing an excess-voltage discharge from said lead to said casing in response to a predetermined increase in voltage over normal, said excess-voltage means also inherently operating in response to a reduction of the surge voltage to substantially cut off said discharge promptly upon the return of normal voltage conditions on the lead being protected, and means for completing the excess-voltage discharge path from the casing to ground.

11. The combination with an encased electrical apparatus having a casing of conducting material, of an insulated lead extending from said apparatus through the apparatus casing, excess-voltage protective means for connecting said lead to said casing, and means for completing the excess-voltage discharge path from the casing to ground, characterized by said excess-voltage means being a vented tubular excess-voltage protective device mounted inside of said casing and having venting means for discharging gases outside of the casing without discharging any gas or vapor into the casing during excess-voltage discharge.

12. The combination with an encased electrical apparatus having a casing of conducting material, of an insulated lead extending from said apparatus through the apparatus casing, excess-voltage protective means for connecting said lead to said casing, and means for completing the excess-voltage discharge path from the casing to ground, characterized by said excess-voltage means being a vented tubular excess-voltage protective device mounted inside of said casing and comprising a tubular insulator with an electrode in each end and with gas-evolving insulator material for evolving gases in a spark-gap space between the electrodes within the tube when subjected to an electric arc, one of said electrodes comprising means for tightly closing its end of the tube, the other electrode being vented and being secured tightly both to its end of the tube and to a hole provided therefor in the apparatus casing, whereby said evolved gases are vented to the outside atmosphere, and means for completing the excess-voltage discharge path from the casing to ground.

13. The combination with an encased electrical apparatus having a casing of conducting material, of an insulated lead extending from said apparatus through the apparatus casing, excess-voltage protective means for connecting said lead to said casing, and means for completing the excess voltage discharge path from the casing to ground, characterized by said excess-voltage means being a vented tubular excess-voltage protective device mounted inside of said casing and comprising a tubular insulator with an electrode in each end and with gas-evolving insulator material for evolving gases in a spark-gap space between the electrodes within the tube when subjected to an electric arc, one of said electrodes comprising a molded composition resistor within said tube and means for tightly closing its end of the tube, the other electrode being vented and being secured tightly both to its end of the tube and to a hole provided therefor in the apparatus casing, whereby said evolved gases are vented to the outside atmosphere, and means for completing the excess-voltage discharge path from the casing to ground.

14. An excess-voltage protective device comprising a tubular insulator with an electrode in each end and with gas-evolving insulator material for evolving gases in a spark-gap space between the electrodes within the tube when subjected to an electric arc, a molded composition resistor within the tube in contact with one of said electrodes, means in contact with the other end of said resistor for making one of the terminal connections of the protective device, the other electrode being vented to permit the escape of the evolved gases.

15. The combination with an encased electrical apparatus having a casing of conducting material, of a plurality of insulated leads extending from said apparatus through the apparatus casing, a plurality of excess-voltage protective means disposed within said casing for severally connecting each of a plurality of said leads to said casing, and means for completing the excess-voltage discharge path from the casing to ground, characterized by said excess-voltage means being of a type which will change from substantially a non-conductor to a voltage-limiting conductor at a predetermined excess-voltage, and which will promptly change back again from a conductor to substantially a non-conductor when an excess-voltage surge has been dissipated and the voltage on said lead returns to the normal voltage of said apparatus, whereby said apparatus is renderd truly surge-proof in being able to continue to give service without interruption by a surge.

16. A surge-proof protective device for a transformer having a conducting casing, and a plurality of high-tension leads and a plurality of low-tension leads all extending from said transformer through said casing, said protective device comprising excess-voltage means associated with each of a plurality of said leads for providing an excess-voltage discharge from said associated lead to said casing in response to a predetermined increase in voltage over normal, said excess-voltage means also inherently operating in response to a reduction of the surge voltage to substantially cut off said discharge promptly upon the return of normal voltage conditions on the lead being protected, and means for completing the excess-voltage discharge path from the casing to ground.

17. An electrical device comprising a winding, leads for connecting the winding to an external circuit, a core for said winding, insulation between the winding and the core, a casing about the winding, and a plurality of self extinguishing electric discharge devices disposed within said casing and connected from said winding to the core for limiting over voltage stresses on the insulation to a predetermined value.

18. A surge-proof protective device for a transformer having a conducting casing, a plurality of high-tension leads and a plurality of low-tension leads all extending from said transformer through said casing, and bushing means for insulating said leads from the casing, said transformer comprising an insulated high-tension winding connected to said high-tension leads and an insulated low-tension winding connected to said low-tension leads, at least one of said low-tension leads being a grounded neutral lead, and sparkover means for facilitating an excess-voltage discharge between said grounded neutral lead and the casing, said protective device comprising high-tension excess-voltage means associated with each high-tension lead for providing an excess-voltage discharge from said associated lead to said casing in response to a predetermined increase in voltage over normal, said high-tension excess-voltage means also inherently operating in response to a reduction of the surge voltage to substantially cut off said discharge promptly upon the return of normal voltage conditions on the lead being protected.

19. A surge-proof transformer having a conducting casing, a plurality of high tension leads and a plurality of low-tension leads all extending from said transformer through said casing, and bushing means for insulating said leads from the casing, said transformer comprising an insulated high-tension winding connected to said high-tension leads and an insulated low-tension winding connected to said low-tension leads, and protective means for discharging excess-voltage surges from said high-tension leads to ground, characterized by said protective means being of a type which will change from substantially a non-conductor to a voltage-limiting conductor at a predetermined excess-voltage, and which will promptly change back again from a conductor to substantially a non-conductor when an excess-voltage surge has been dissipated and the voltage on said lead returns to the normal voltage of said apparatus, and further characterized by a low-tension discharge device between said low-tension leads and the casing, whereby the winding insulation is fully protected.

20. An electrical device comprising a plurality of windings, a supporting structure for said winding comprising a magnetic core and an enclosing casing, insulation for insulating each of said windings from each other and from the supporting structure, said insulation being of different strength on some of said windings, self extinguishing electrical discharge devices connected between each of the windings and the supporting structure for limiting the stresses between the windings and between each of the windings and the supporting structure to a value approximately proportional to the strength of the insulation on the several members.

JOHN K. HODNETTE.